United States Patent
Cascio, II

(10) Patent No.: US 9,144,293 B1
(45) Date of Patent: Sep. 29, 2015

(54) DUCK CALL ORGANIZER

(71) Applicant: Ducks, Ducks & More Ducks, Monroe, LA (US)

(72) Inventor: Joe David Cascio, II, Monroe, LA (US)

(73) Assignee: Ducks, Ducks & More Ducks, LLC, Monroe, LA (US)

( * ) Notice: Subject to any disclaimer, the term of this patent is extended or adjusted under 35 U.S.C. 154(b) by 0 days.

(21) Appl. No.: 14/601,924

(22) Filed: Jan. 21, 2015

(51) Int. Cl.
*A45F 5/00* (2006.01)
*A01M 31/00* (2006.01)

(52) U.S. Cl.
CPC .............. *A45F 5/004* (2013.01); *A01M 31/004* (2013.01)

(58) Field of Classification Search
CPC ..... A45F 5/00; A45F 5/004; A45F 2005/006; A45F 5/021; A01M 31/004
See application file for complete search history.

(56) References Cited

U.S. PATENT DOCUMENTS

| | | | | |
|---|---|---|---|---|
| 3,968,670 | A * | 7/1976 | Quenot | 70/456 R |
| 4,733,808 | A * | 3/1988 | Turner et al. | 224/219 |
| 5,513,785 | A * | 5/1996 | Campagna, Jr. | 224/162 |
| 5,864,925 | A * | 2/1999 | McGee | 24/3.11 |
| 2003/0042348 | A1* | 3/2003 | Salentine et al. | 242/380 |
| 2004/0035897 | A1* | 2/2004 | Salentine et al. | 224/162 |
| 2004/0089759 | A1* | 5/2004 | Genuise | 242/379 |
| 2005/0011982 | A1* | 1/2005 | Salentine et al. | 242/379.2 |
| 2005/0173477 | A1* | 8/2005 | Scott | 224/148.6 |
| 2008/0106409 | A1* | 5/2008 | Schmidt | 340/568.1 |
| 2008/0283651 | A1* | 11/2008 | Ito et al. | 242/386 |
| 2010/0206976 | A1* | 8/2010 | Salentine et al. | 242/379.2 |
| 2012/0168472 | A1* | 7/2012 | Mathews | 224/162 |
| 2013/0168423 | A1* | 7/2013 | Paugh et al. | 224/162 |
| 2013/0181019 | A1* | 7/2013 | Salentine et al. | 224/242 |
| 2014/0175135 | A1* | 6/2014 | Paugh et al. | 224/219 |

* cited by examiner

*Primary Examiner* — Brian D Nash
(74) *Attorney, Agent, or Firm* — Husch Blackwell LLP; Edward D. Manzo; George S. Pavlik

(57) ABSTRACT

A duck or game call organizer includes a band to be worn on the duck hunter's body and several retractors located along the band. Each retractor provides a line to connect a respective call device so that the user may select a call device, extend it from the band and operate it, and release it. The retractor then retracts the call device to the band. The band may provide a cradle for each retractor to orient or align the call device in a predetermined position when it retracts.

21 Claims, 1 Drawing Sheet

DUCK CALL ORGANIZER

FIELD OF THE INVENTION

The present invention relates generally to accoutrements for hunting and more particularly to a wearable organizer for holding waterfowl calls or call devices for other animals.

BACKGROUND OF THE INVENTION

Waterfowl hunting generally involves the use of some of the folling items: a shotgun, a hunting blind, decoys, a boat, and a duck or goose call. The "call" or "call device" is a mechanical apparatus that the hunter blows into, much like a musical wind instrument, but to simulate a sound made by the waterfowl. Hunters may use decoys to lure the fowl within range and a blind to conceal the hunter. When waterfowl comes into sight, the hunter uses a duck (or goose) call to entice the prey to come within range, whereupon the hunter drops the call and quickly shoots at the birds.

This technique involves various problems. One is that there are many different game waterfowl, and they make many different sounds. The duck call is designed to make one or more sounds that emulate that of the prey. At least two dozen types of ducks live in North America, not including such other water birds as eiders, loons, mergansers, smews, scoters, and teals. To name some, this includes the American Black Duck, American Goldeneye, American Widgeon, Barrows Goldeneye, Black-bellied Whistling-Duck, Black Scoter, Blue Winged Teal, Bufflehead, Canvasback, Cinnamon Teal, Common Eider, Common Goldeneye, Common Merganser, Common Pochard, Common Shelduck, Eastern Spot-billed Duck, Eurasian Wideon, Falcated Duck, Fulvous Whistling-duck, Gadwall, Greater Scaup, Green Winged Teal, Harlequin Duck, Hybrid Ducks, King Eider, Long-tailed Duck, Lesser Scaup, Mallard, Manky Mallard, Mandarin Duck, Mexican Mallard, Mottled Duck, Muscovy Duck and Domestic Muscovy Duck, Northern Shoveler, Pekin Duck, Pintail Duck, Red Breasted Merganser, Redhead, Ring-necked Duck, Ruddy Shelduck, Surf Scoter, Tuffled Duck, West Indian Whistling-Duck, White Winged Scoter, and Wood Duck.

As a result of this wide variety of waterfowl, the hunter needs more than one duck call device at the ready. That is, the hunter often will not have foreknowledge of which specific waterfowl might be flying by or otherwise in the area, and upon seeing the animal will have to select the right duck call device, raise it to his mouth, execute the call, and then, when the prey comes within range, drop the call device very quickly, raise the shotgun, take aim, and fire.

Because of the variety of waterfowl, many different duck or goose call devices (simply known as "calls") are sold today, and duck hunters typically carry a small assortment on the hunt. Typically the hunter uses a carrying apparatus in the form of a lanyard worn about the neck. See http://www.cabelas.com/catalog/browse/call-lanyards-pouches/ . . . /N-1100100+4294388038/Ne-4294388038?WTzst=Guided Nav&WTz_stype=GNU. Each duck call device has a connector several inches long, and the connectors attach to different positions along the lanyard or to a central position. It is common for a hunter to have a half dozen duck call devices connected in this way. In addition, other known hunting call holders can include a strap that can be fastened around a user's wrist as in U.S. Pat. No. 4,733,808. A call device can be secured to such holder by an elastic tube or strap and can be activated by a hunter by bringing his head to his wrist (or vice versa).

The call lanyard is prevalent among hunters, but it has several drawbacks. A common problem is that the duck calls hang downward some inches and the connectors become tangled. The connectors need to be long enough for the hunter to grab the call device quickly and raise it to his mouth without having to disconnect the call from the lanyard, which would take extra time. Also, the hunter needs to drop the call quickly when the fowl comes within shooting range, and preferably the call will remain attached to the lanyard instead of falling to the ground, marsh, or other place where the hunter has taken position.

An alternative to the lanyard is called a "Call Bridle" that is made by an entity operating under the name "Down & Dirty Outdoors." See http://www.downndirtyoutdoors.com/dnd-callbridle.aspx. The bridle comprises a small pouch with a connecting strap for connecting around the neck and back. The front of the pouch has several vertically-oriented pockets each sized to hold a duck or goose call device. The pouch is "lightweight water resistant neoprene construction with neck and back strap to keep the calls protected and close to your body (helps prevent freezing also)." These are intended to be worn on the upper chest, and each call may be connected by a cord or the like to the bridle so that the hunter can drop it after calling without worrying that it will fall to the ground, water, etc.

A principal object of the present invention is to provide an apparatus that improves the carrying and usage of duck calls in the field.

SUMMARY OF THE INVENTION

A feature of the present invention is retractors for the call devices. Preferably each call device is connected to its own retractor. Preferably the retractors are arranged in a row or other pattern along a generally linear strap or band which preferably is connectable to a neck harness, chest harness, waist cinch, or other devices to connect to the user. Preferably the band is positioned across the upper chest when in use to provide less distance between the retractor and the user's mouth.

Preferably the retractor is spring-loaded and operates automatically. Preferably the retractor has a line, cord or string that extends from a casing of the retractor. Illustratively the retractor is circular, and preferably the string extends from the center of the case. It may alternatively extend from a circumferential or peripheral position or other position. The retractor may be of the type that includes a catch so that the line or string can remain extended until the user tugs on it to release the catch whereupon the retractor automatically pulls and rewinds the line or string and, with it, the duck call. The retractor may also be the kind that does not have a catch so that it retracts with no further action on the part of the user once he releases the call from his mouth.

The duck call harness may include a cradle or other receiving apparatus for each retractor, or for several but not all of them. Preferably the cradle is located adjacent to the retractor or so that the line or string operates to pull the call device into the cradle. Preferably the cradle orients the call device in a generally vertical orientation.

According to a method, a call device is retractably connected to a rest location. A user may pull the call device away from its rest position, operate it, and release it. The method includes retracting the call device back to its rest position. Advantageously, the method includes providing a plurality of respective rest positions for separate call devices, thereby allowing a user to choose any of the several call devices, operate it, and retracting the call device to its respective rest position. Preferably the method includes automatically orienting the duck calls in a predetermined orientation in connection with the retraction.

The apparatus and method can be used with game calls for other animals.

DESCRIPTION OF A PREFERRED EMBODIMENT

Figure 1:
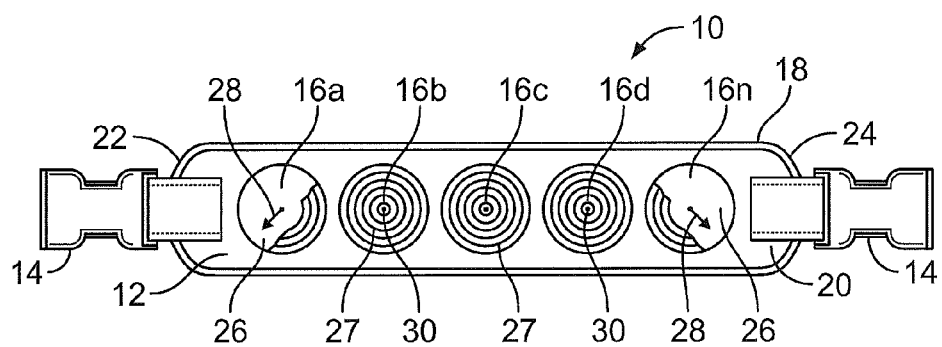
FIG. 1 is a front elevation view of a representative game call organizer according to embodiments presented herein, shown without call devices secured thereto.

While this invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

As described herein, embodiments of the subject invention are directed to a wearable game call organizer that can be useful when hunting waterfowl or other game. According to such embodiments, the organizer can accommodate a plurality of game call devices on retractable reel devices which enable a wearer to quickly access the calls to lure nearby fowl and to further prevent the calls from being snarled, dropped or lost upon being released when the wearer draws or fires a weapon.

Figure 2:
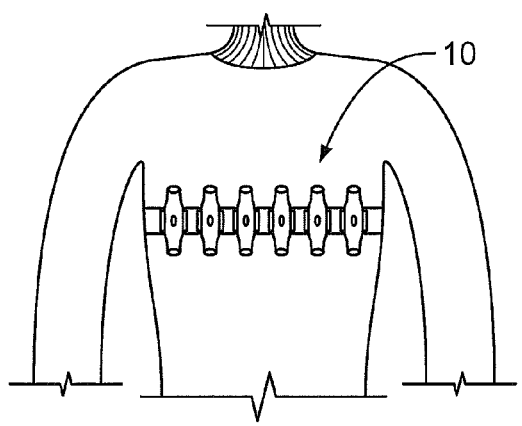
FIG. 2 is a front elevation view of the organizer secured about the chest area of a person.

With reference now to the figures, FIG. 1 illustrates a representative game call organizer 10 according to embodiments presented herein. Generally, organizer 10 can include an elongated strap, belt or band 12 having a closure or fastener 14 for securing the band 12 around a user and a retractor device 16, and preferably a plurality of retractor devices 16a . . . 16n. The band 12 can have opposing first and second sides 18, 20 and a length with opposing ends 22, 24 which can engage one another to form a loop that can wrap around a portion of a person, such as for example the person's chest, waist or neck area. FIG. 2 illustrates an exemplary organizer 10 secured around a wearer's chest area.

It will be understood by persons of ordinary skill in the art that the band 12 can be different lengths, widths or thicknesses without departing from the scope of the subject invention. Preferably, band 12 has a width on the order of two inches and a length sufficient to accommodate five to six retractors 16a . . . 16n.

It is generally well known that waterfowl hunters can be regularly exposed to harsh and wet environmental conditions. Accordingly, band 12 can be fabricated from a flexible material that is strong, durable and waterproof. Such material can include, for example, neoprene or other synthetic rubber, or a heavy duty woven fabric such as nylon. Upon being fastened around a user, one side 18 of band 12 can be positioned against the user's body (or more precisely against clothing worn by the user), while the other side 20 can face outward away from the user. The side 18 of band 12 adjacent the user's body can additionally include a deformable elastic material such as spandex, lycra or elastic which can enable band 12 to better conform around the wearer to provide a more comfortable and snug fit without binding or becoming too tight.

The organizer 10 can additionally be incorporated into garments or clothing, including shirts, vests, coats, etc. For example, band 12 can be sewn into the front portion of a shirt or jacket. Alternatively, a shirt or jacket can have receptacles, loops or other attachment members sewn under each arm pit. Clips or fasteners at the ends 22, 24 of band 12 can be secured or inserted into the attachment members, and the band 12 can extend across the front of the shirt or jacket. It will be understood that fasteners 14 can also be connected to a belt with complementary connectors. It will be further recognized that a single organizer 10 or multiple organizers 10 can be worn or secured to a wearer's clothing. For example, where multiple organizers are desired, a first organizer 10 can be worn across the user's chest and a second organizer 10 below the first organizer 10 on or around the user's midsection or waist. Alternatively, one organizer 10 can be located on the left side of a hunter's shirt or jacket and another organizer 10 can be located on the right side thereof.

The fastener 14 can be any type of clip, buckle, snap, clasp, button, hook and eye or hook and loop configuration (e.g., Velcro®). For example, one end 22 of band 12 can include a clasp, or a portion of a clip or snap, with the opposing end 24 having a reciprocal element for receiving the clip or snap. Alternatively, one end 22 of band 12 can be a free end which can be extended through a clip or buckle. Band 12 can additionally include an additional loop or hook and eye fasteners to secure additional length from the free end to the looped band 12 so that it does not protrude outwardly or hang, which can be bothersome to the wearer.

The retractable reel devices or retractors 16a . . . 16n can be substantially similar to commercially available retractable reel devices that are commonly used to carry security badges or key cards. See e.g. ID badge retractors available for sale by Security Imaging.com at http://www.securityimaging.com/Max-Label,1275.html. In particular, the retractors 16a . . . 16n can include an exterior casing 26 enclosing a rotatable reel (not shown) and a biasing member such as a spring mechanism 27. Although FIG. 1 shows the retractors as having a circular casing 26, the retractors 16a . . . 16n can be any shape or size as desired. An elongated flexible material 28, such as a nylon cable, wire or string can be wrapped around the interior reel and can extend through an opening 30 in the casing 26. The opening 30 can be centrally located on casing 26 or can be in alternate locations, including for example on the bottom of the casing.

FIG. 1 illustrates an organizer 10 having five retractors 16a . . . 16n. the number of retractors 16a . . . 16n, however, is not critical and persons of ordinary skill in the art will recognize that additional or fewer retractors 16a . . . 16n can be provided without departing from the scope of the subject invention. Organizer 10 can additionally feature a sleeve (not shown) or additional layer of material such as neoprene that can extend over a portion of band 12 to conceal and protect the retractors 16a . . . 16n from coming in contact with external substances such as mud which can interfere with or cause damage to the retractors 16a . . . 16n. The sleeve can include holes that can be aligned with the opening 30 of the retractors 16a . . . 16n so that the cord 18 can extend through the sleeve.

A duck call device can be secured to a free end of the elongated flexible material 28 extending from the casing 26. The free end can additionally include a fastener such as a ring, loop, strap, clip or collar to secure the call device. Thus, when a user pulls a duck call away from a retractor 16a . . . 16n, tension is applied to the elongated flexible material 28 and additional material 28 can be unwound from the rotating interior reel and pulled from the retractor 16a . . . 16n. As this occurs, the internal spring 27 begins to uncoil. The elongated flexible material 28 can be of sufficient length to allow the duck call to comfortably extend from the resting position adjacent a retractor 16a . . . 16n to the user's mouth. Thus, it is preferable that the elongated cord 28 be able to extend a distance of between 2" to 2'. When the user releases the duck call device, the tension on the elongated flexible material 28 is withdrawn and the internal spring 27 retracts the elongated flexible material 28 back into the casing 26 and around the internal reel. Thus, the duck call is pulled back to the retractor 16a . . . 16n.

Figure 3:
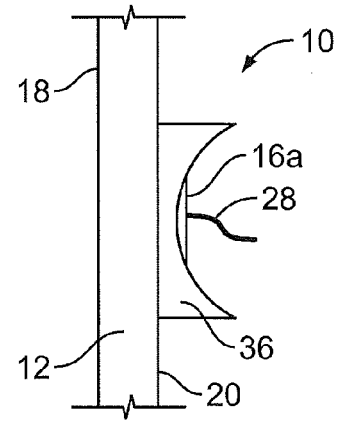
FIG. 3 is top plan view of portion of an organizer showing a cradle or base for a game call according to embodiments presented herein

As illustrated in FIG. 3, the organizer 10 can additionally include a cradle-shaped base or receiving apparatus 36 adjacent a retractor 16a . . . 16n for receiving and orienting a duck call on the band 12. Preferably, the cradle 36 can be secured around the face of a retractor or to the sleeve positioned in front of a retractor 16a . . . 16n so that the elongated cord 28 can pull the call device into the cradle 36. Preferably the cradle 36 can have an outwardly-facing surface having a concave shape with a central vertical channel and raised side edges. Thus, such configuration can provide a platform or resting place for the duck call and can align the duck call in a generally vertical orientation, so that they are easy to access and do not interfere with one another on the band 12.

Figure 4:
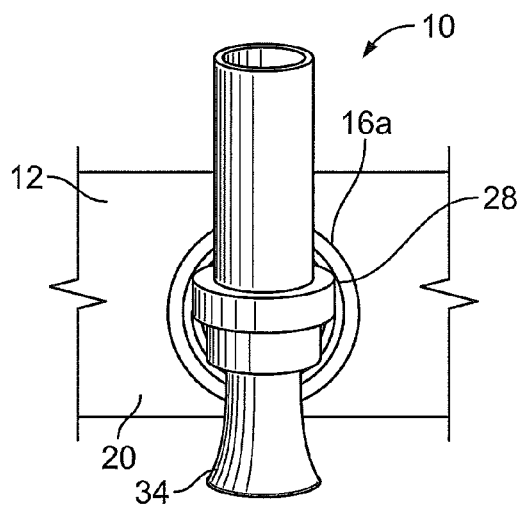
FIG. 4 is a front elevation view of a game call device secured to a retractor in a substantially retracted position.

FIG. 4 illustrates a duck call 34 in a substantially retracted position against the face of a retractor 16a. As can be seen, when retracted, the duck call 34 can be posited in a substantially upright or vertical orientation which provides for quick access by a user and minimizes interferences from duck calls on adjacent retractors.

The retractors 16a . . . 16n can be positioned on the outward-facing side 20 of band 12 between the opposing first and second ends 22, 24. Retractors 16a . . . 16n can be fixedly secured at specific locations along the length of the band 12 at predetermined distances from ends 22, 24 and from each other, or they can be located at adjustable positions along the length of band 12 so that they can be positioned in desired locations. In addition, retractors 16a . . . 16n can further be removable from band 12 so that they can be fixed or replaced.

Figure 5:
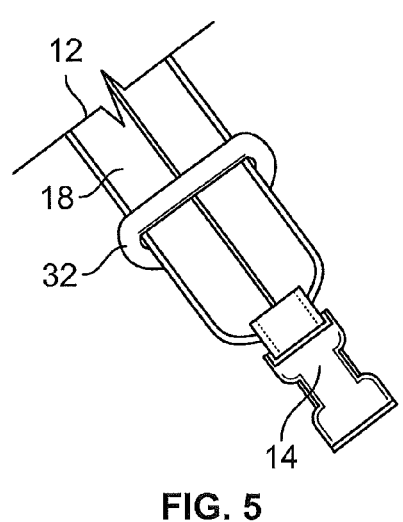
FIG. 5 is a perspective view of the reverse side of the strap of a game call organizer showing a band for securing a retractor to the strap.

FIG. 5 illustrates the inward-facing side 18 of a band 12 according to embodiments presented herein. According to such embodiments, a strap or loop 32 can extend around the band 12 to secure a retractor 16a . . . 16n to the band 12. Strap 32 can be comprised of an elastic non-slip material and include padding so as to not cause undue pain or irritation to a person wearing the organizer 10. The strap 32 can further be cinched around and tightened to band 10.

Persons of ordinary skill in the art will recognize that embodiments presented herein have several advantages over known devices and methods for carrying duck calls. In particular, embodiments of the subject invention can hold the duck calls in a stationary position so that they do not get tangled with one another. Thus, users are able to quickly access, retrieve and operate the desired call device. In addition, the revolving reel of retractors 16a . . . 16n is generally noiseless and is unlikely to frighten off nearby waterfowl. Another advantage resides in the fact that the automatic recoil of retractors 16a . . . 16n enables a user to quickly release a call in order to draw, aim and fire a weapon. Thus, the user does not have to spend valuable time attempting to return the call to a pocket or holder and further does not have to drop the call and risk losing or damaging it.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A game call organizer for organizing and holding a plurality of game call devices while a user is in the field, comprising:
   an elongated band to be worn by a user;
   a plurality of retractors in engagement with the band, each retractor having a corresponding line to be extended from and retracted to the retractor a distance of at least several inches; each line including a connector to engage a game call device; and
   a plurality of cradles mounted above corresponding ones of said retractors, each said cradle being shaped to receive a generally columnar game call device, wherein the corresponding retractor is located behind the cradle and arranged to retract the game call device into its cradle.

2. The organizer of claim 1 wherein each said retractor includes a housing that contains the line in a coil.

3. The organizer of claim 1 further comprising a game call device affixed to one of said connectors on the line of one of said retractors.

4. The organizer of claim 1 further comprising a cover that is independent from and external to the retractors and that extends over at least some of the retractors to conceal and protect the retractors associated with the cover from coming into contact with external substances, the cover having corresponding holes to permit the lines of the associated retractors to extend through the cover.

5. The organizer of claim 4 further comprising a plurality of cradle-shaped bases mounted adjacent the corresponding ones of said retractors, each said cradle being shaped to receive a generally columnar game call device, wherein the corresponding retractor is located behind the cradle and arranged to retract the game call device into its cradle.

6. The organizer of claim 1 further comprising a fastener, the fastener allowing the elongated band to form a loop.

7. The organizer of claim 1 where the elongated band is comprised of neoprene.

8. The organizer of claim 1 further comprising a strap for securing the retractor to the band.

9. The organizer of claim 8 where the strap is adjustable along a length of the elongated band, such adjustment enabling the retractor to be positioned at different positions along the band.

10. The organizer of claim 1 further including a garment to be worn by a user, wherein the organizer is affixed to the garment.

11. A game call organizer comprising:
   an elongated flexible band having a first side and a second side and opposing first and second ends;
   a plurality of retractors on the first side of the band between the first end and the second end, the retractors having a casing enclosing a spring and a reel having an elongated flexible material wound thereon, the elongated flexible material extending from the reel though an opening in the casing, the elongated flexible material having a free end opposite the reel with a connector for connecting to a game call; and
   a plurality of cradles positioned above corresponding ones of the retractors, each cradle being sized and configured for receiving a game call device when the elongated material is in a retracted position, wherein the retractors are arranged to retract the corresponding game call devices into their corresponding cradles.

12. The organizer of claim 11 where the band is comprised of neoprene and further comprising respective connectors affixed at the first and second ends of the band.

13. The organizer of claim 11 further comprising a cover layer of material extending over at least a portion of the band to conceal and protect the retractors, the cover layer of material having a plurality of holes for permitting the elongated flexible material of the retractors to extend through the cover, the plurality of holes being aligned with the casing openings of the retractors.

14. The organizer of claim 11 where the retractors are removably secured to the band and can be adjusted into different positions along a length of the band.

15. A game call organizer for organizing and holding a plurality of game call devices while a user is in the field, comprising:

an elongated band to be worn by a user;

a plurality of retractors in engagement with the band, each retractor having a corresponding line to be extended from and retracted to the retractor a distance of at least several inches;

wherein each line includes a connector to engage a game call device;

wherein the plurality of retractors are mounted to the band;

wherein each retractor includes a respective opening through which the line passes;

wherein the band further comprises a cover in the form of a layer of material extending over the retractors to conceal and protect the retractors from coming into contact with external substances such as mud;

wherein the cover includes holes to permit the lines of the associated retractors to extend through the cover;

wherein the holes of the cover are aligned with the openings of the retractors.

16. The organizer of claim 15 further comprising a plurality of cradles mounted adjacent the corresponding ones of said retractors, each said cradle being shaped to receive a generally columnar game call device, wherein the corresponding retractor is located behind the cradle and arranged to retract the game call device into its cradle.

17. A game call organizer comprising:

an elongated flexible band having a first side and a second side and opposing first and second ends;

a plurality of retractors on the first side of the band between the first end and the second end, the retractors having a casing enclosing an elongated flexible material, the elongated flexible material extending though an opening in the casing, the elongated flexible material having a free end opposite the reel with a connector for connecting to a game call;

a layer of material extending over at least a portion of the band to conceal and protect the retractors, the cover having a plurality of holes for permitting the elongated flexible material of the retractors to extend through the cover, the plurality of holes being aligned with the casing openings of the retractors; and a plurality of cradles positioned above corresponding ones of the retractors, each cradle being sized and configured for receiving a game call when the elongated material is in a retracted position.

18. A game call organizer for organizing and holding a plurality of game call devices while a user is in the field, comprising:

an elongated band including at least one fastener permitting the band to be connected to a garment, belt, or lanyard worn by a user;

at least one retractor in engagement with the band, each said retractor having a corresponding line to be extended from and retracted to the retractor a distance of at least several inches;

each line including a connector to engage a game call device;

at least one cradle configured to hold and orient a game call device, wherein the cradle is positioned relative to the retractor so that when the line is in a retracted position, a game call device attached to the line is oriented by the cradle; and wherein the elongated band is not a trouser belt.

19. The game call organizer of claim 18 wherein the elongated band further includes a cover that is not part of the retractor, wherein the cover includes an opening through which the line of a corresponding retractor passes.

20. The game call organizer of claim 19 further comprising at least one cradle configured to hold and orient a game call device, wherein the cradle is positioned relative to the retractor so that when the line is in a retracted position, a game call device attached to the line is oriented by the cradle.

21. The game call organizer of claim 19 wherein the elongated band is sized to be worn across the chest of the user.

* * * * *